United States Patent
Jeong (10) Patent No.: US 10,203,932 B2
(45) Date of Patent: Feb. 12, 2019

(54) APPARATUS AND METHOD FOR DYNAMICALLY OBTAINING AND DISPLAYING SURVEILLANCE IMAGES AND TRACKED EVENTS

(71) Applicant: Hanwha Techwin Co., Ltd., Changwon-si (KR)

(72) Inventor: Doo Won Jeong, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 233 days.

(21) Appl. No.: 15/373,602

(22) Filed: Dec. 9, 2016

(65) Prior Publication Data

US 2017/0177287 A1 Jun. 22, 2017

(30) Foreign Application Priority Data

Dec. 17, 2015 (KR) .................. 10-2015-0181082

(51) Int. Cl.
| | | |
|---|---|---|
| *G06F 3/147* | (2006.01) | |
| *H04N 7/18* | (2006.01) | |
| *G06K 9/62* | (2006.01) | |
| *G06K 9/00* | (2006.01) | |

(52) U.S. Cl.
CPC ......... *G06F 3/147* (2013.01); *G06K 9/00771* (2013.01); *G06K 9/6202* (2013.01); *G06K 9/6267* (2013.01); *H04N 7/181* (2013.01); *G06F 2203/04803* (2013.01)

(58) Field of Classification Search
None
See application file for complete search history.

(56) References Cited

U.S. PATENT DOCUMENTS

| | | | | |
|---|---|---|---|---|
| 2006/0220836 A1* | 10/2006 | Wei | .......... | G08B 25/14 340/539.2 |
| 2008/0303903 A1* | 12/2008 | Bentley | ............ | G08B 13/19606 348/143 |
| 2014/0333776 A1* | 11/2014 | Dedeoglu | .............. | H04N 7/181 348/159 |

FOREIGN PATENT DOCUMENTS

| | | |
|---|---|---|
| KR | 10-0849689 | 7/2008 |
| KR | 10-1218360 | 12/2012 |
| KR | 10-1345270 | 12/2013 |
| KR | 10-1444006 | 9/2014 |

(Continued)

*Primary Examiner* — Heather R Jones
(74) *Attorney, Agent, or Firm* — H.C. Park & Associates, PLC (57) ABSTRACT

A method for dynamically obtaining and displaying surveillance images and dynamically tracking events, including receiving event occurrence information corresponding to one or more surveillance cameras; classifying the surveillance cameras detecting an event occurrence into one or more groups of event detection cameras based on the event occurrence information; dynamically arranging and displaying one or more real-time images acquired by the event detection cameras on a first screen, the real-time images being dynamically arranged on the first screen according to the one or more groups, and the arrangement of the real-time images on the first screen being dynamically variable according to a number of the detected events; and displaying an event image acquired within a preset time range before and after a first event detection time point by the event detection camera that first detects an event among the event detection cameras belonging to each group.

20 Claims, 8 Drawing Sheets

(56) References Cited

FOREIGN PATENT DOCUMENTS

KR   10-2015-0077057   7/2015

* cited by examiner

APPARATUS AND METHOD FOR DYNAMICALLY OBTAINING AND DISPLAYING SURVEILLANCE IMAGES AND TRACKED EVENTS

CROSS-REFERENCE TO RELATED APPLICATION

This application claims priority from and the benefit of Korean Patent Application No. 10-2015-0181082, filed on Dec. 17, 2015, which is hereby incorporated by reference for all purposes as if fully set forth herein.

BACKGROUND

Field

Exemplary embodiments of the invention relate to surveillance camera systems and, more particularly, methods and apparatuses for providing images received from one or more surveillance cameras and dynamically displaying one or more tracked events with the provided images.

Discussion of the Background

Currently, surveillance cameras are installed in many locations, and technologies for detecting, recording, and storing an event occurrence in an image acquired by a surveillance camera are being developed.

In particular, as the number of installed surveillance cameras increases, multi-channel image display apparatuses for receiving images from a plurality of cameras to survey a surveillance target region are being actively developed.

However, since such an image display apparatus displays images of several channels in a fixed layout on one screen, when an event occurs in an image of a particular channel, a separate operation is required to closely observe the image. Moreover, it is difficult to monitor multiple events, such as, e.g., an intruder and a fire event, occurring at the same time.

The above information disclosed in this Background section is only for enhancement of understanding of the background of the inventive concepts, and, therefore, it may contain information that does not form the prior art that is already known in this country to a person of ordinary skill in the art.

SUMMARY

Apparatus and methods for dynamically obtaining and displaying surveillance images and tracked events employing the inventive concepts permit a manager to cope with an event more rapidly and efficiently by repeatedly displaying not only a real-time (live) image obtained about the event, but also dynamically displaying an event occurrence image, which may be the start of the event, on a separate screen distinguished from a screen on which images of all channels are displayed in set locations on the screen.

Exemplary implementations of the invention also permit easy image identification by grouping detected events and providing group-by-group event images to a user.

Exemplary implementations of the invention also provide past images to a user more effectively.

Additional aspects will be set forth in part in the description which follows and, in part, will be apparent from the disclosure, or may be learned by practice of the inventive concepts.

According to one aspect of the invention, a method for dynamically obtaining and displaying surveillance images and dynamically tracking events is disclosed, the method including: receiving event occurrence information corresponding to one or more surveillance cameras; classifying one or more of the surveillance cameras detecting an event occurrence into one or more groups of event detection cameras based on the event occurrence information; dynamically arranging and displaying one or more real-time images acquired by the one or more event detection cameras on a first screen, the real-time images being dynamically arranged on the first screen according to the one or more groups, and the arrangement of the real-time images on the first screen being dynamically variable according to a number of the detected events; and displaying an event image acquired within a preset time range before and after a first event detection time point by the event detection camera that first detects an event among the event detection cameras belonging to each group.

The step of dynamically arranging and displaying may include: dividing the first screen into one or more first regions based on the number of groups; and matching each of the one or more first regions to at least one group.

The step of dynamically arranging and displaying may further include: dividing the first region into one or more second regions: repeatedly displaying the event image of the group corresponding to the first region in any one of the one or more second regions: and displaying the real-time image acquired by the event detection camera belonging to the group corresponding to the first region in the other second region among the one or more second regions except the second region in which the event image is displayed.

The step of dividing the first screen into one or more first regions may divide the first screen such that the one or more first regions are arranged in a first direction, and the step of dividing the first region into one or more second regions may divide the first region such that the one or more second regions are arranged in a second direction different from the first direction.

The step of dynamically arranging and displaying may further include, when an extra second region for arranging the real-time image acquired by the event detection camera is not present in the first region, dynamically re-arranging and displaying the real-time image acquired by the event detection camera and displayed in the other second region except the second region displaying the event image; and sequentially displaying the real-time image in an event occurrence detection order from a time point when the extra second region is not present.

The step of dynamically arranging and displaying may further include: acquiring a user input to at least one of the one or more first regions; dividing the first screen into one or more third regions based on the user input; repeatedly displaying the event image of the group corresponding to the user input in any one of the one or more third regions, and displaying the real-time image acquired by the event detection camera belonging to the group corresponding to the user input in the other third region among the one or more third regions, except the region in which the event image is displayed.

The step of dynamically arranging and displaying may further include displaying the image displayed in the third region, instead of the image displayed in the first region and the second region, on the first screen.

The step of dynamically arranging and displaying may further include, when an extra third region for arranging the real-time image acquired by the event detection camera is not present in the first screen, dynamically re-arranging and displaying the real-time image acquired by the event detection camera in the other third region except the third region displaying the event image, sequentially in an event occurrence detection order from a time point when the extra third region is not present.

The step of dynamically arranging and displaying may further include displaying a favorite, pre-stored image in the other second region among the one or more second regions except the region in which the event image is displayed.

The step of displaying the favorite image may include: identifying an event type of the group corresponding to the first region; and displaying the favorite image corresponding to the event type among the pre-stored favorite images in the other second region among the second regions included in the first region except the region in which the event image is displayed.

The step of classifying may classify the one or more event detection cameras into one or more groups according to a type of the event.

The step of classifying may further include generating, when an event detection camera is not to be classified as a pre-generated group, a new group corresponding to the event detection camera, and the step of dividing the first screen into one or more first regions further includes dividing the first screen into one or more first regions based on the number obtained by adding the number of new groups to the number of groups.

The method may further include displaying one or more real-time images acquired by the one or more surveillance cameras on a second screen distinguished from the first screen, along with an event identification mark.

According to another aspect of the invention, there is also disclosed an apparatus for dynamically obtaining and displaying surveillance images and dynamically tracking events, the apparatus including: an information receiver receiving event occurrence information corresponding to one or more surveillance cameras; a group generator classifying the one or more surveillance cameras detecting event occurrence into one or more groups of event detection cameras based on the event occurrence information; and a display controller dynamically arranging and displaying one or more real-time images acquired by the one or more event detection cameras on a first screen according to the one or more groups, the arrangement of the real-time images on the first screen being dynamically variable according to a number of the detected events; and displaying an event image acquired within a preset time range before and after a first event detection time point by the event detection camera that first detects an event among the event detection cameras belonging to each group.

The display controller may divide the first screen into one or more first regions based on the number of groups and match each of the one or more first regions to at least one group.

The display controller may divide the first region into one or more second regions, repeatedly display the event image of the group corresponding to the first region in any one of the one or more second regions, and display the real-time image acquired by the event detection camera belonging to the group corresponding to the first region in the other second region among the one or more second regions except the second region in which the event image is displayed.

The display controller may display a favorite, pre-stored image in the other second region among the one or more second regions except the region in which the event image is displayed.

The display controller may identify an event type of the group corresponding to the first region and display the favorite image corresponding to the event type among the pre-stored favorite images in the other second region among the second regions included in the first region except the region in which the event image is displayed.

The display controller may classify the one or more event detection cameras into one or more groups according to a type of the event.

The display controller may display one or more real-time images acquired by the one or more surveillance cameras on a second screen distinguished from the first screen and further display an event identification mark in the image with the occurrence of an event among the one or more real-time images with reference to the event occurrence information.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIG. 1A and FIG. 1B illustrate a surveillance display system according to an exemplary embodiment of the invention, where

DETAILED DESCRIPTION OF THE ILLUSTRATED EMBODIMENTS

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The inventive concepts may include various embodiments and modifications, and certain embodiments are illustrated in the drawings and will be described below in detail. However, it will be understood that the inventive concepts are not limited to the embodiments and includes all modifications, equivalents and substitutions falling within the spirit and scope of the inventive concepts. In the following description, detailed descriptions of well-known functions or configurations will be omitted since they would unnecessarily obscure the subject matters of the inventive concepts.

Although terms such as "first" and "second" may be used herein to describe various elements or components, these elements or components should not be limited by these terms. These terms are only used to distinguish one element or component from another element or component.

The terms used herein are for the purpose of describing particular embodiments only and are not intended to limit the inventive concepts. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

The embodiments may be described in terms of functional block components and various processing operations. Such functional blocks may be implemented by any number of hardware and/or software components that execute particular functions. For example, the embodiments may employ various integrated circuit (IC) components, such as memory elements, processing elements, logic elements, and lookup tables, which may execute various functions under the control of one or more microprocessors or other control devices. Similarly, where the elements of the embodiments may be implemented by software programming or software elements, the embodiments may be implemented by any programming or scripting language such as C, C++, Java, or assembly language, with various algorithms being implemented by any combination of data structures, processes, routines, or other programming elements. Functional aspects may be implemented by an algorithm that is executed in one or more processors. Also, the embodiments may employ the related art for electronic environment setting, signal processing, and/or data processing. Terms such as "mechanism", "element", "unit", and "configuration" may be used in a broad sense, and are not limited to mechanical and physical configurations. The terms may include the meaning of software routines in conjunction with processors or the like.

Figure 1A:
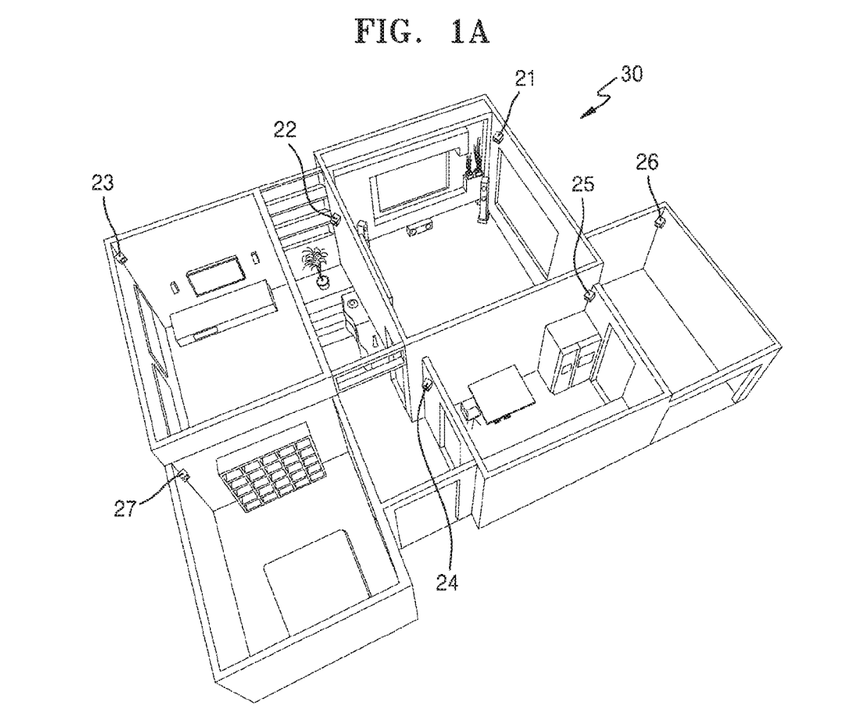
FIG. 1A illustrates a surveillance target region.
Figure 1B:
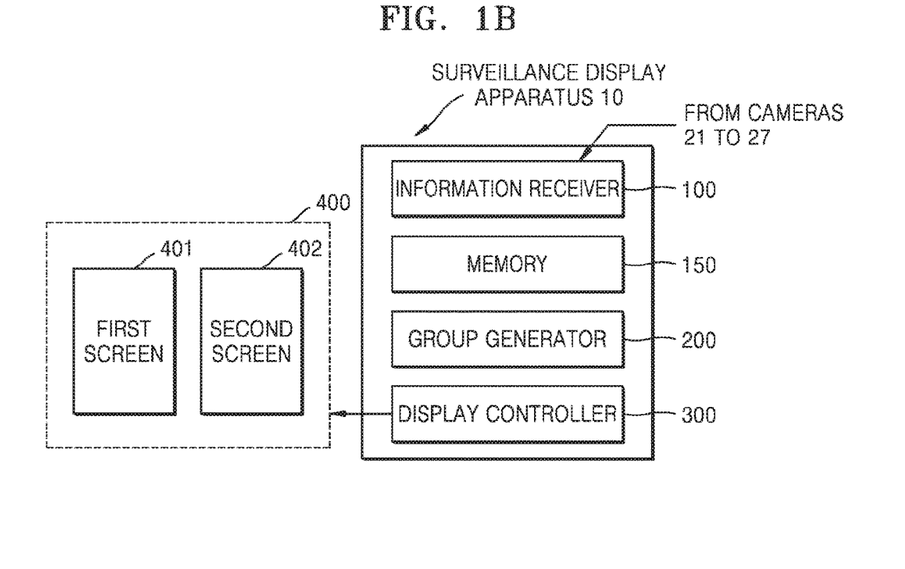
FIG. 1B is a block diagram of a surveillance display apparatus in communication with cameras in the surveillance target region of FIG. 1A.

FIGS. 1A and 1B illustrate a surveillance display system according to an exemplary embodiment of the invention.

Referring to FIGS. 1A and 1B, the surveillance display system may include a surveillance display apparatus 10 shown in FIG. 1B that is in communication with one or more surveillance cameras 21 to 27 installed in a surveillance target region 30 shown in FIG. 1A.

Each of the surveillance cameras 21 to 27 may be a camera including a lens and an image sensor. The lens may be a lens group including one or more lenses. The image sensor may convert an image, which is input by the lens, into an electrical signal. For example, the image sensor may be a semiconductor device such as a charge-coupled device (CCD), a complementary metal oxide semiconductor (CMOS), or other similar devices known in the art that may convert an optical signal into an electrical signal (hereinafter described as an image).

The one or more surveillance cameras 21 to 27 may be, for example, cameras that provide general RGB images of a photographing target space, infrared images, or distance images including distance information.

The one or more surveillance cameras 21 to 27 may be arranged in various ways such that no dead angle is present in the surveillance target region 30. For example, the one or more surveillance cameras 21 to 27 may be arranged such that the sum of the viewing angles of the one or more surveillance cameras 21 to 27 is equal to or greater than that of the surveillance target region 30.

In this case, the surveillance target region 30 may be various spaces that need to be monitored by a manager. For example, the surveillance target region 30 may be any space such as an office, a public facility, or a house where there is a concern about theft of goods. The surveillance target region 30 may be any space, such as a factory, a power plant, or an equipment room, where there is a concern about accident occurrence. However, these are merely examples, and the inventive concepts are not limited thereto.

The surveillance cameras 21 to 27 may further include an event detector. The event detector may be, for example, a human and/or animal motion detector, such as a passive infrared sensor (PIR) sensor or an infrared sensor. The event detector may be an environment change detector, such as a temperature sensor, a humidity sensor, or a gas sensor. The event detector may be a device for determining the occurrence/nonoccurrence of an event by comparing the images acquired over time, such as prior to and subsequent to certain events or time periods.

The event detector may be included in the surveillance cameras 21 to 27 as described above, or may be installed in the surveillance target region 30 separately from the surveillance cameras 21 to 27.

When the event detector is installed separately from the surveillance cameras 21 to 27, the one or more surveillance cameras 21 to 27 and one or more event detectors may be mapped to each other. For example, a PIR sensor installed adjacent to the surveillance camera 22 in the surveillance target region 30 may be mapped to the surveillance camera 22. Accordingly, event detection information of the PIR sensor may be used as event occurrence information of the surveillance camera 22.

Hereinafter, for convenience of description, it is assumed that the surveillance cameras 21 to 27 include the event detector. However, the inventive concepts are not limited thereto.

The one or more surveillance cameras 21 to 27 and/or the event detector (in the case where the event detector is provided separately) may transmit event occurrence/nonoccurrence information and/or acquired images to the surveillance display apparatus 10 through a network. The network described herein may be, for example, but is not limited to, a wireless network, a wired network, a public network such as the Internet, a private network, a Global System for Mobile communications (GSM) network, a General Packet Radio Service (GPRS) network, a Local Area Network (LAN), a Wide Area Network (WAN), a Metropolitan Area Network (MAN), a cellular network, a Public Switched Telephone Network (PSTN), a Personal Area Network (PAN), a Bluetooth network, a Wi-Fi Direct (WFD) network, a Near Field Communication (NFC) network, a Ultra Wide Band (UWB) network, any combination thereof, or any other network.

According to an exemplary embodiment of the invention, the surveillance display apparatus 10 may include various modules, such as an information receiver 100, a group generator 200, a display controller 300, and a display 400. The information receiver 100 may receive event occurrence information from the one or more surveillance cameras 21 to 27 through the network. The group generator 200 may classify one or more event detection cameras detecting event occurrence among the one or more surveillance cameras 21 to 27 into one or more groups based on the event occurrence information received by the information receiver 100. The display controller 300 may arrange and display one or more real-time (live) images acquired by the one or more event detection cameras on a first screen 401 of the display 400 according to the one or more groups. In this case, the display controller 300 may further display an event image acquired before and after a first event detection time point by the event detection camera first detecting an event among the event detection cameras belonging to each group, on the first screen 401 of the display 400, with respect to each of the one or more groups. The display controller 300 may display one or more real-time images acquired by the one or more surveillance cameras 21 to 27 on a second screen 402 of the display 400. The display 400 may display images on the first screen 401 and the second screen 402 under the control of the display controller 300.

The above classification of the information receiver 100, the group generator 200, the display controller 300, and the display 400 are merely functional classifications for convenience. The respective components may be provided in software and/or hardware, and need not be physically clearly divided from each other; the functions performed by the respective components may be performed in a mutually overlapping manner; and some components may be omitted and/or included in other components. For example, the display controller 300 and the display 400 may be configured as an integrated display.

According to an exemplary embodiment of the invention, the information receiver 100 may receive the event occurrence information corresponding to the one or more surveillance cameras 21 to 27.

As described above, when the one or more surveillance cameras 21 to 27 include the event detector, the surveillance display apparatus 10 may receive the event occurrence information from the one or more surveillance cameras 21 to 27 through the network.

When the event detector is provided separately from the surveillance cameras 21 to 27, the surveillance display apparatus 10 may receive the event occurrence information from the event detector.

Herein, the event occurrence information may include the identification information of the surveillance cameras 21 to 27 detecting the event, the event occurrence time, and the detailed information about the event. In this case, the detailed information about the event may vary according to the type of event detected by the surveillance cameras 21 to 27. For example, when the surveillance cameras 21 to 27 detect a human motion, the event occurrence information may include "human detection" as information about the event type, and "detected" or "undetected" as information about the event content. In addition, the event occurrence information may further include information about the event, such as the event occurrence time and the event occurrence place.

For example, when the surveillance cameras 21 to 27 detect a fire event, the event occurrence information may include "fire" or "temperature change" as information about the event type, and "fire occurrence" or "temperature rise" as information about the event content. In addition, the event occurrence information may further include additional information about the event such as the event occurrence time and the event occurrence place.

According to an exemplary embodiment of the invention, the group generator 200 may classify one or more event detection cameras detecting event occurrence among the one or more surveillance cameras 21 to 27 into one or more groups based on the event occurrence information received from the one or more surveillance cameras 21 to 27.

Herein, the term "event detection camera" may refer to the surveillance camera detecting the event.

First, the group generator 200 may extract the event detection camera detecting the event occurrence in various ways. For example, the group generator 200 may extract all the surveillance cameras detecting the event as the event detection camera. This method may be used, for example, when the surveillance target region 30 is a space, such as a bank or a safe, that requires strict surveillance.

The group generator 200 may also extract the surveillance camera detecting the event a preset number of times or more as the event detection camera. This method may be used, for example, when the surveillance target region 30 is a space that requires relatively relaxed surveillance, such as a house where a slight object motion may occur due to the wind caused by the open window.

Furthermore, only when two or more adjacent surveillance cameras simultaneously detect the event, the group generator 200 may extract the cameras as the event detection camera.

However, the above methods are merely examples, and the inventive concepts are not limited thereto.

Herein, the term "group" may refer to a group including one or more event detection cameras, and the group including each event detection camera may be determined according to the type of the event detected by each event detection camera.

The group may be a dynamic group having a configuration that changes over time. For example, assume the case where a motion detection event occurs first at a time point t1 and the number of surveillance cameras detecting the motion increases over time. In this case, the group may further include one or more event detection cameras that detect the motion additionally over time.

Furthermore, assume the case where a fire event occurs at a time point t4, which is later than the time point t1 and, thus, the number of surveillance cameras detecting the fire event increases over time. In this case, separately from the above group corresponding to the motion detection event, the group corresponding to the fire event may further include one or more event detection cameras that detect the fire event additionally over time.

When an event detection camera is not to be classified as a pre-generated group, the group generator 200 may generate a new group corresponding to the event detection camera. On the other hand, when an event detection camera is to be classified as a pre-generated group, the group generator 200 may classify the event detection camera as the corresponding group without generating a new group.

In this manner, the inventive concepts may implement event-by-event surveillance camera management by classifying and managing the event detection cameras detecting the same-type event as one group.

According to an exemplary embodiment of the invention, the display controller 300 may arrange and display one or more real-time images acquired by the one or more event detection cameras on the first screen 401 of the display 400 according to the one or more groups. In this case, the display controller 300 may display, on the first screen 401, an event image acquired within a preset time range before and after a first event detection time point by the event detection camera first detecting an event among the event detection cameras belonging to each group.

Herein, the term "real-time image" may refer to an image that has only a slight difference between the time when the image is acquired by one or more event detection cameras and the time when the image is displayed on the first screen 401 or the second screen 402. That is, the real-time image may refer to an image about an event that occurs currently in a target region that is photographed by one or more event detection cameras.

On the other hand, herein, the term "event image" may refer to an image pre-stored in memory 150 in the surveillance display apparatus 10. That is, the event image may refer to an image that is stored in the memory 150 in the surveillance display apparatus 10 after being acquired by the event detection camera within the preset time range before and after the first event detection time point. For example, the event image may be an image that is captured from about 10 minutes before to about 5 minutes after the event occurrence time point. The above time range may be set by the user.

Herein, the expression "displaying the images by the group (or on a group-by-group basis)" may refer to grouping and displaying the images acquired by the surveillance cameras belonging to the same group, according to a predetermined rule. For example, displaying the images by the group may refer to displaying the images acquired by the surveillance cameras belonging to the same group, in the same row or the same column on the first screen 401. However, this is merely an example, and the inventive concepts are not limited thereto. For example, any method may be used to display the images of a group discriminatively from the images of another group.

Herein, the first screen 401 and the second screen 402 of the display 400 may refer to two screens that are physically separated from each other, or may refer to screens that are divided in one physical screen. For example, the first screen 401 and the second screen 402 may be configured as separate display devices, or may refer to two windows that are configured in a picture-in-picture (PIP) mode in one display device.

Hereinafter, various methods of displaying the images on the first screen 401 by the display controller 300 will be described in detail.

According to an exemplary embodiment of the invention, the display controller 300 may divide the first screen 401 into one or more first regions based on the number of groups generated by the group generator 200. The display controller 300 may match each of the one or more first regions to at least one group.

In other words, the display controller 300 may divide the first screen 401 by the number of generated groups and determine each divided portion as a region for displaying images of at least one group.

For example, when the number of groups generated by the group generator 200 is 2, the display controller 300 may divide the first screen 401 into two first regions, match the first first region to the first group, and match the second first region to the second group. Accordingly, the image acquired by the event detection camera belonging to the first group may be displayed in the first region, and the image acquired by the event detection camera belonging to the second group may be displayed in the second first region.

The display controller 300 may divide the first region into one or more second regions. In this case, the second region may be to display the image acquired by the event detection camera.

The display controller 300 may divide the screen in various ways. For example, the display controller 300 may divide the first screen 401 such that the one or more first regions are arranged in a first direction, and divide each of the first regions such that the one or more second regions are arranged in a second direction different from the first direction. In this case, for example, the first direction may be the vertical direction of the first screen 401, and the second direction may be the horizontal direction of the first screen 401.

The display controller 300 may repeatedly display the event image of the group corresponding to the first region in any one of the one or more second regions. The display controller 300 may display the real-time image acquired by the event detection camera belonging to the group corresponding to the first region, in the other second region among the one or more second regions except the second region in which the event image is displayed.

Furthermore, when an extra second region for arranging the real-time image acquired by the event detection camera is not present in the first region, the display controller 300 may again arrange and display the real-time image acquired by the event detection camera in the other second region except the second region displaying the event image, and the real-time image may be sequentially displayed in an event occurrence detection order from a time point when the extra second region is not present.

In this manner, the display controller 300 may repeatedly display the event image in a portion of the first region. In the other portion of the first region, the display controller 300 may sequentially display the real-time images acquired by the surveillance cameras detecting the same-type event.

Furthermore, when an extra space for displaying the real-time image is not present in the first region, since the real-time image with a new event detected is displayed instead of the previous real-time image, the most recent event image of the event of the corresponding type may be always displayed in the first region.

According to another exemplary embodiment of the invention, the display controller 300 may require a user input to at least one of the one or more first regions.

In this case, the user input to the first region may be a user input for selecting the group corresponding to the first region.

For example, the user may perform a user input to the first region by performing a touch input to the first region displayed on the first screen 401. Through a separate input, the user may perform an input to the first region displayed on the first screen 401. However, this is merely an example, and the inventive concepts are not limited thereto.

The display controller 300 may divide the first screen 401 into one or more third regions based on the user input. The display controller 300 may repeatedly display the event image of the group corresponding to the user input in any one of the one or more third regions. The display controller 300 may display the real-time image acquired by the event detection camera belonging to the group corresponding to the user input, in the other third region among the one or more third regions except the region in which the event image is displayed.

When an extra third region for arranging the real-time image acquired by the event detection camera is not present in the first screen 401, the display controller 300 may again arrange and display the real-time image acquired by the event detection camera, in the other third region except the third region displaying the event image, and the real-time image may be sequentially displayed in an event occurrence detection order from a time point when the extra third region is not present.

Furthermore, the display controller 300 may display the image displayed in the third region, instead of the image displayed in the first region and/or the second region, on the first screen 401. In other words, when the user selects a group from the screen displaying an image about a plurality of groups, the display controller 300 may display an image about the selected group instead of the image about the plurality of groups.

Accordingly, the inventive concepts may provide a more detailed image about the user's interest group.

According to another exemplary embodiment of the invention, the display controller 300 may display a favorite image in the other second region among the one or more second regions except the region in which the event image is displayed.

Herein, as a pre-stored image, the favorite image may be an image that is stored in a memory 150 because the user determines the image to be again observed while using the surveillance display system according to the inventive concepts.

In order to display the favorite image, the display controller 300 may identify the event type of the group corresponding to the first region and display the favorite image corresponding to the identified event type among the pre-stored favorite images in the other second region among the second regions included in the first region except the region in which the event image is displayed.

For example, assume that the user stored an image of a person with a suspicious motion as a favorite image regarding a motion detection event during the operation of the surveillance display system at a time point in the past, and a motion detection event is currently occurring. In this case, the display controller 300 may simultaneously display the current image and the favorite image stored by the user, to allow the user to quickly contrast the current image with the past motion image of the suspicious person.

Accordingly, the inventive concepts may provide the past image to the user more effectively.

FIGS. 2 to 5 are diagrams illustrating examples of the operations of the display controller 300 according to an exemplary embodiment of the invention.

Figure 2:
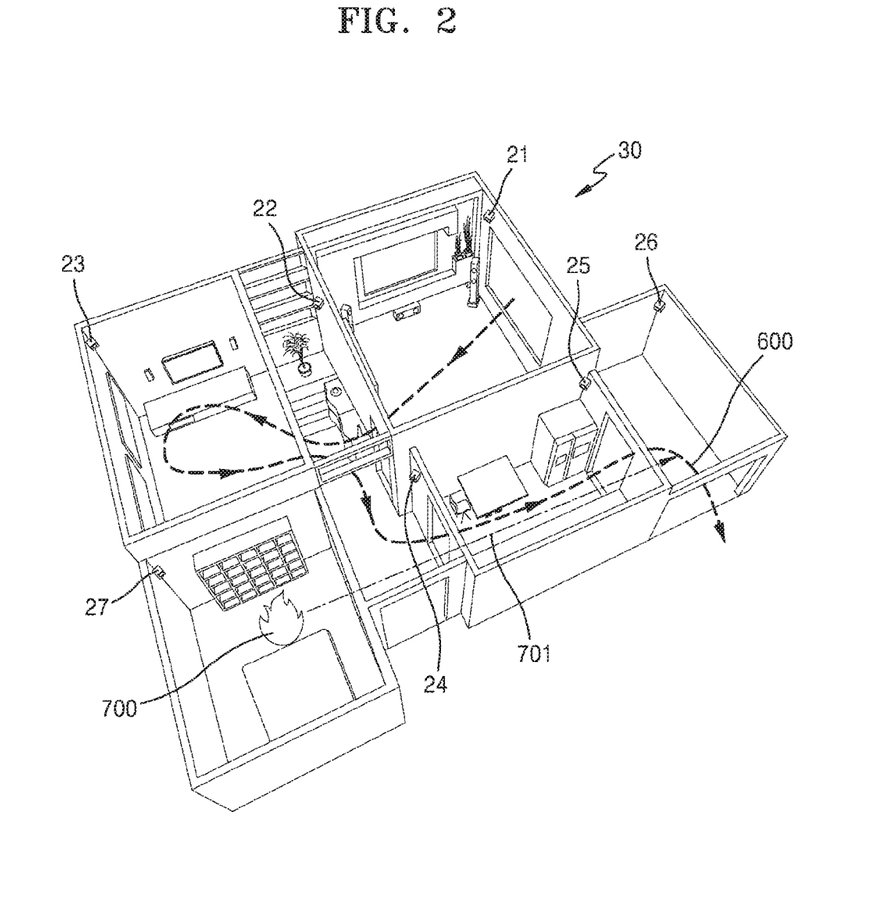
FIG. 2 is a diagram illustrating an example of an installation environment of the surveillance display apparatus according to an exemplary embodiment of the invention and an operation of the surveillance display apparatus according an event occurrence.

FIG. 2 is a diagram illustrating an example of the installation of the surveillance display apparatus 10 in the surveillance target region 30 according to an exemplary embodiment of the invention and an operation of the surveillance display apparatus 10 according an event occurrence.

Referring to FIG. 2, it is assumed that an outsider has intruded into the surveillance target region 30 and has moved along a path 600. It is also assumed that a fire event 700 has occurred in the surveillance target region 30 and has moved along a path 701.

It is assumed that each of the surveillance cameras 21 to 27 is installed in each area and includes a human body sensor and a temperature sensor as the event detector.

Based on this assumption, the surveillance cameras 21 to 27 may detect an event occurrence along the movement path 600 of the outsider, and the information receiver 100 may receive the event occurrence information detected by the surveillance cameras 21 to 27. Referring to the movement path 600 of the outsider, each surveillance camera may detect the event occurrence in the order of the surveillance camera 21, the surveillance camera 22, the surveillance camera 23, the surveillance camera 24, the surveillance camera 25, and the surveillance camera 26, and the information receiver 100 may receive the event occurrence information in the above order.

The surveillance cameras 21 to 27 may also detect an event occurrence along the movement path 701 of the fire event 700, and the information receiver 100 may receive the event occurrence information detected by the surveillance cameras 21 to 27. Referring to the movement path 701 of the fire event 700, each surveillance camera may detect the event occurrence in the order of the surveillance camera 27, the surveillance camera 24, the surveillance camera 25, and the surveillance camera 26, and the information receiver 100 may receive the event occurrence information in the above order.

Hereinafter, in FIGS. 3A to 5, descriptions will be given based on the assumption of the example of FIG. 2.

Figure 3A:
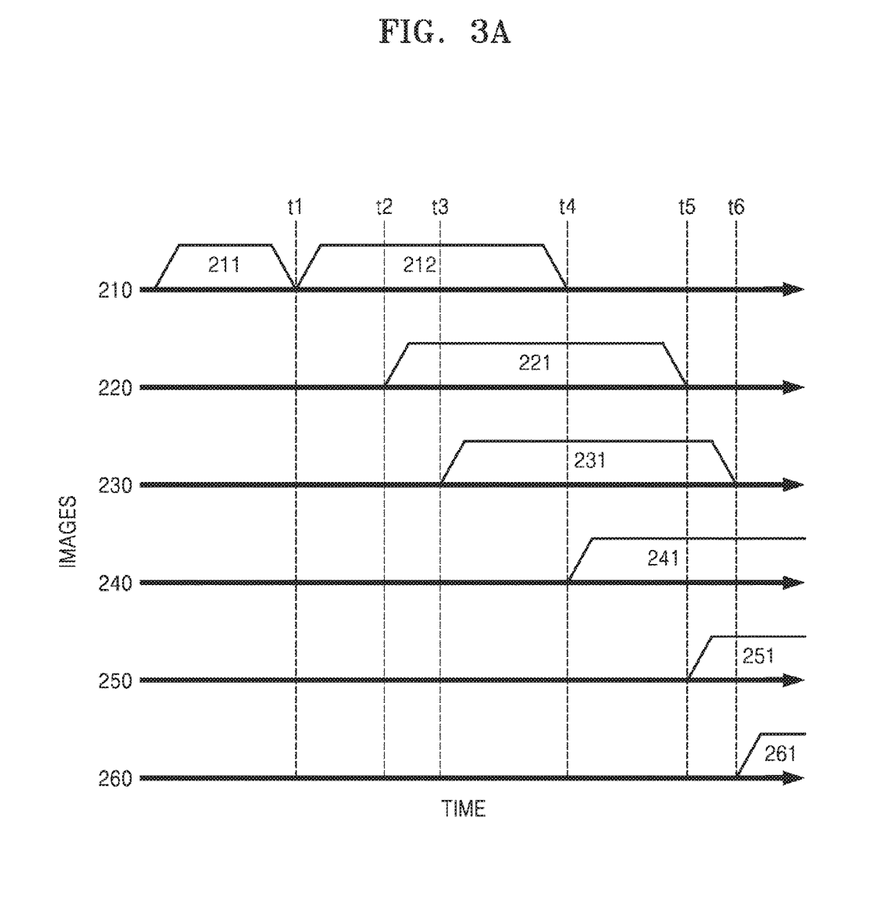
FIG. 3A is a diagram related to the timing of images relating to an outsider intrusion event that is displayed on a first screen.
Figure 3B:
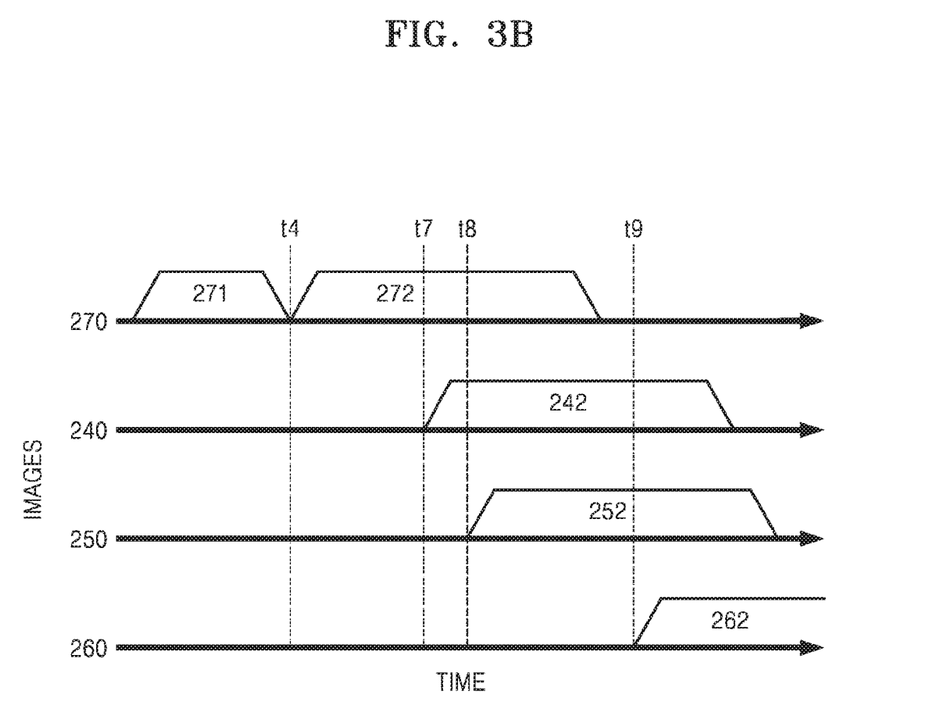
FIG. 3B is a diagram related to the timing of images relating to an outsider intrusion event and a fire event that is displayed on a first screen.

FIGS. 3A and 3B are diagrams related to the images displayed on the first screen 401, based on the assumption of the example of FIG. 2.

FIG. 3A is a diagram related to an image about an outsider intrusion event that is displayed on the first screen 401.

Referring to FIG. 3A, it is assumed that the respective surveillance cameras 21 to 26 have detected the outsider at time points t1 to t6 respectively. It is also assumed that reference numerals 210, 220, 230, 240, 250, and 260 respectively denote images acquired over time by the respective surveillance cameras 21 to 26, and reference numerals 211, 212, 221, 231, 241, 251, and 261 respectively denote partial images acquired in the respective time slots by the corresponding surveillance cameras. The partial image may refer to an image from a particular start time point to a particular end time point. For example, the partial image 212 may refer to an image acquired by the surveillance camera 21 from the time point t1 to the time point t4.

For convenience of description, it is assumed that the above fire event 700 has occurred after the time point t6 in FIG. 3A.

Figure 4A:
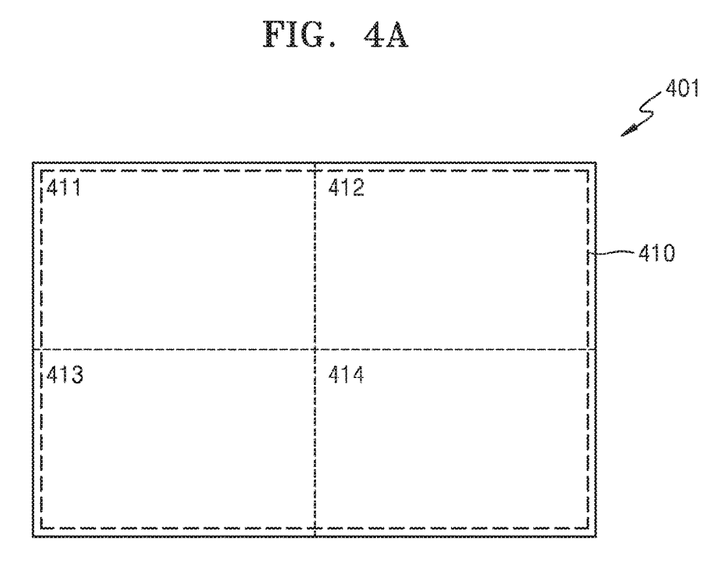
FIG. 4A illustrates an example of the first screen according to FIG. 3A.

Referring to FIG. 4A, it is assumed that the first screen 401 is divided into a first region 410 and four second regions 411, 412, 413, and 414.

Based on the above assumption, the images displayed on the first screen 401 in the respective time slots may be referred to in Table 1 below.

TABLE 1

| | Region | | | | |
|---|---|---|---|---|---|
| Time | 411 | 412 | 413 | 414 | Note |
| t1~t2 | 211 | 212 | | | |
| t2~t3 | 211 | 212 | 221 | | |
| t3~t4 | 211 | 212 | 221 | 231 | |
| t4~t5 | 211 | 241 | 221 | 231 | Lack of space |
| t5~t6 | 211 | 241 | 251 | 231 | |
| t6 | 211 | 241 | 251 | 261 | |

FIG. 3B is a diagram related to an image about an outsider intrusion event and a fire event that is displayed on the first screen 401.

As in the above example, referring to FIG. 3A, it is assumed that the respective surveillance cameras 21 to 26 have detected the outsider at the time points t1 to t6 respectively. It is also assumed that the reference numerals 210, 220, 230, 240, 250, and 260 respectively denote the images acquired over time by the respective surveillance cameras 21 to 26 and the reference numerals 211, 212, 221, 231, 241, 251, and 261 respectively denote the partial images acquired in the respective time slots by the corresponding surveillance cameras.

Referring to FIG. 3B, it is assumed that the respective surveillance cameras 27, 24, 25, and 26 have detected the fire event at the time points t4, t7, t8, and t9 respectively. In this case, it is assumed that the time points t7 to t9 are after the time point t6. It is also assumed that reference numerals 240, 250, 260, and 270 respectively denote images acquired over time by the respective surveillance cameras 24 to 27 and reference numerals 271, 272, 242, 252, and 262 respectively denote partial images acquired in the respective time slots by the corresponding surveillance cameras.

Figure 4B:
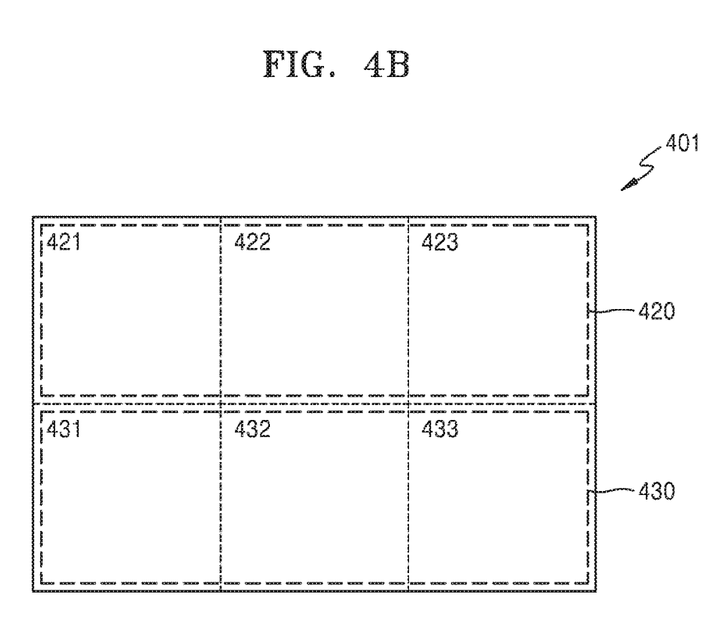
FIG. 4B illustrates an example of the first screen according to FIG. 3B.

Referring to FIG. 4B, it is assumed that the first screen 401 is divided into two first regions 420 and 430 and the first regions 420 and 430 are respectively divided into three second regions 421 to 423 and 431 to 433.

Based on the above assumption, the images displayed on the first screen 401 in the respective time slots between the time point t4 and the time point t9 are referred to in Table 2 below.

TABLE 2

| Time | Region | | | | | |
|---|---|---|---|---|---|---|
| | 421 | 422 | 423 | 431 | 432 | 433 |
| t 4~t 5 | 211 | 231 | 241 | 271 | 272 | — |
| t 5~t 6 | 211 | 251 | 241 | 271 | 272 | — |
| t 6~t 7 | 211 | 251 | 261 | 271 | 272 | — |
| t 7~t 8 | 211 | 251 | 261 | 271 | 272 | 242 |
| t 7~t 8 | 211 | 251 | 261 | 271 | 252 | 242 |
| t 8~t 9 | 211 | 251 | 261 | 271 | 252 | 262 |

As illustrated in FIGS. 3A and 4A, only the image about the outsider intrusion event may be displayed on the first screen 401 from the time point t1 to the time point t4.

As an alternative exemplary embodiment of the invention, unlike in Table 2, only the image about the fire event may be displayed on the first screen 401 even after the time point t6, as illustrated in FIGS. 3A and 4A.

In this manner, the inventive concepts may group the detected events and provide the group-by-group event images to the user dynamically on the screen 401 to allow easy identification thereof and tracking of an event by the user.

Furthermore, the inventive concepts may dynamically change the configuration of the first screen 401 according to the number of tracked events to allow more efficient use of the screen. Thus, the occurrence of one or more events can be dealt with more rapidly and efficiently by repeatedly displaying not only a real-time image about the event but also an event occurrence image, which may be the start of the event, on a separate screen (e.g., screen 401 in an exemplary embodiment), as distinguished from a screen on which images of all channels are displayed in fixed positions (e.g., screen 402 in an exemplary embodiment).

Figure 4C:
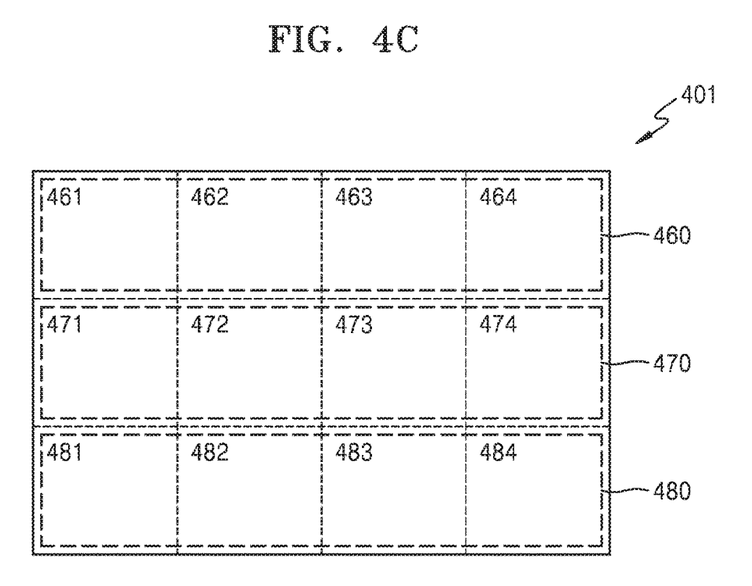
FIG. 4C illustrates an example in which three types of events occur and thus, a first screen is divided into three first regions.
Figure 4D:
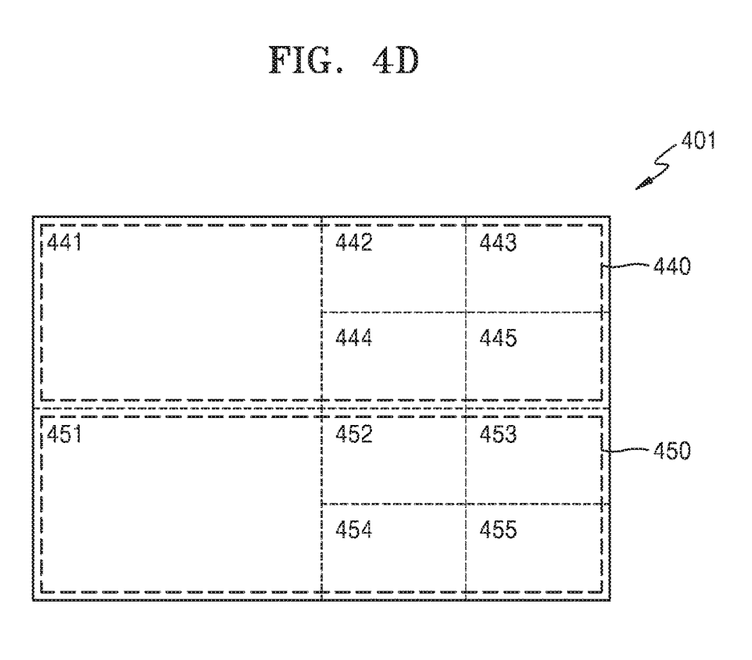
FIG. 4D illustrates an example in which a first region is divided into five second regions of different sizes with respect to two types of events.

FIGS. 4C and 4D illustrate configuration examples of the first screen 401 according to an exemplary embodiment of the invention.

FIG. 4C illustrates an example in which three types of events occur and, thus, the first screen 401 is divided into three first regions 460, 470, and 480.

Referring to FIG. 4C, the first region 460 may be divided into four second regions 461 to 464, the second first region 470 may also be divided into four second regions 471 to 474, and the third first region 480 may also be divided into four second regions 481 to 484.

In this case, the event images of the groups corresponding to the respective first regions 460, 470, and 480 may be displayed in the first second regions 461, 471, and 481 of the respective first regions 460, 470, and 480. The real-time images of the groups corresponding to the respective first regions 460, 470, and 480 may be displayed in the other regions 462 to 464, 472 to 474, and 482 to 484, except the first second regions 461, 471, and 481 of the respective first regions 460, 470, and 480.

FIG. 4D illustrates an example in which first regions 440 and 450 are respectively divided into five second regions 441 to 445 and 451 to 455 of different sizes with respect to two types of events.

In the above example of FIG. 4C, the first region is divided into the second regions of the same size. However, according to an exemplary embodiment of the invention, the first region may be divided into the second regions of different sizes, as illustrated in FIG. 4D.

In this case, the event images of the groups corresponding to the respective first regions 440 and 450 may be displayed in the large second regions 441 and 451, and the real-time images of the groups corresponding to the respective first regions 440 and 450 may be displayed in the other small second regions 442 to 445 and 452 to 455.

Figure 5:
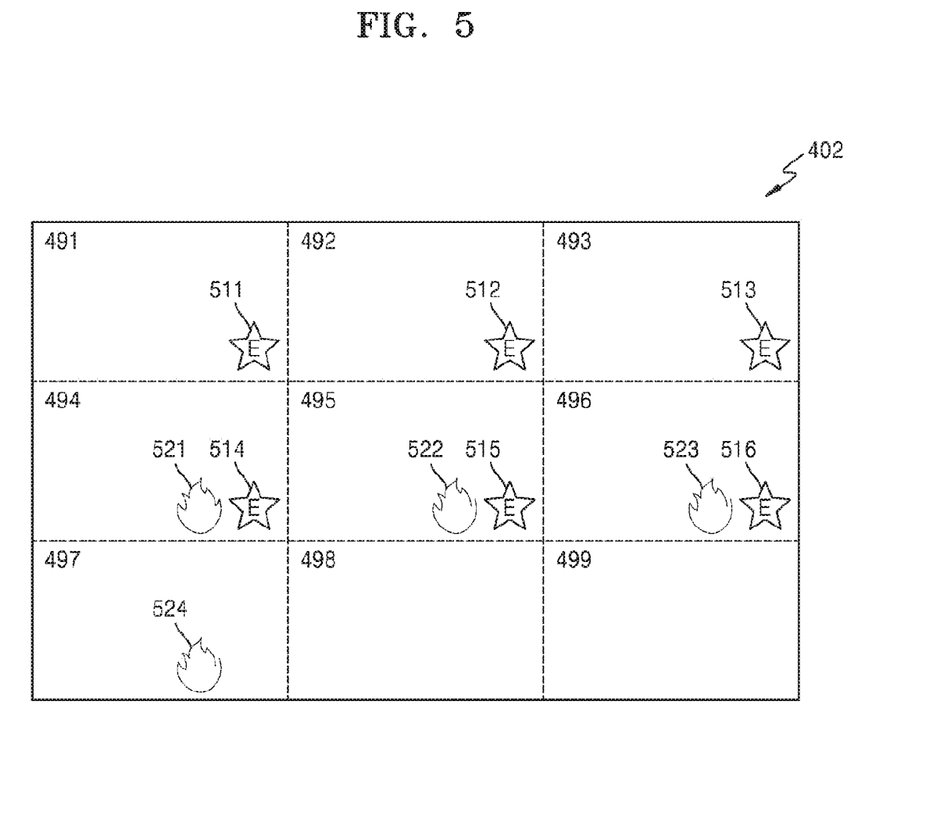
FIG. 5 illustrates a display example of a second screen.

FIG. 5 illustrates a display example of the second screen 402.

According to an exemplary embodiment of the invention, the display controller 300 may display one or more real-time images acquired by the one or more surveillance cameras 21 to 27 on the second screen 402 of the display 400. In this case, the display controller 300 may further display an event identification mark in the image with the event occurrence among the one or more real-time images with reference to the event occurrence information received by the information receiver 100.

Herein, the event identification mark may be a mark that is displayed on the corresponding real-time image to indicate the occurrence of the event. The event identification mark may indicate not only the occurrence/nonoccurrence of an event, but also the type of a generated event. For example, the event identification mark may include bold-processing, color-processing, or flicker-processing the outline of the region in which the corresponding real-time image is displayed.

As an example of the second screen 402, FIG. 5 illustrates that the second screen 402 is divided into nine regions 491 to 499.

Unlike in the first screen 401, the image displayed in each region does not change in the second screen 402. For example, the real-time image acquired by the first surveillance camera 21 may be displayed in the first region 491, and the real-time image acquired by the second surveillance camera 22 may be fixedly displayed in the second region 492.

When an event has occurred as illustrated in FIG. 2, the display controller 300 may further display motion detection event identification marks 511 to 516 in the image with the occurrence of a motion detection event among the real-time images displayed on the second screen 402. The display controller 300 may further display fire event identification marks 521 to 524 in the image with the occurrence of a fire event among the real-time images displayed on the second screen 402.

Accordingly, through the second screen 402, the manager may perform an overall surveillance and also observe the event occurrence image in a focused manner.

Figure 6:
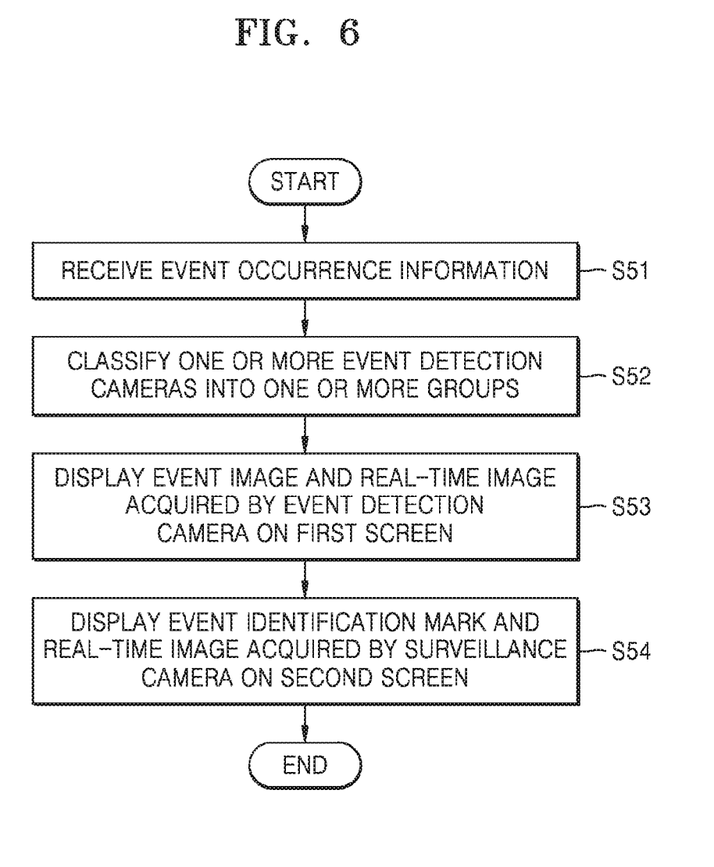
FIG. 6 is a flowchart of a surveillance display method according to an exemplary embodiment of the invention.

FIG. 6 is a flowchart of a surveillance display method performed by the surveillance display apparatus 10 of FIG. 1. Hereinafter, redundant descriptions overlapping with those described in reference to FIGS. 1 to 5 will be omitted for conciseness.

According to an exemplary embodiment of the invention, the surveillance display apparatus 10 may receive event occurrence information corresponding to one or more surveillance cameras (S51).

Herein, the event occurrence information may include the identification information of the surveillance cameras 21 to 27 detecting the event, the event occurrence time, and the detailed information about the event. In this case, the detailed information about the event may vary according to the type of the event detected by the surveillance cameras 21 to 27.

According to an exemplary embodiment of the invention, the surveillance display apparatus 10 may classify one or more event detection cameras detecting the event occurrence among the one or more surveillance cameras into one or more groups based on the event occurrence information received from the one or more surveillance cameras (S52).

Herein, the term "group" may refer to a group including one or more event detection cameras, and the group including each event detection camera may be determined according to the type of the event detected by each event detection camera. The group may also be a dynamic group whose configuration dynamically changes over time.

When an event detection camera is not to be classified as a pre-generated group, the surveillance display apparatus 10 may generate a new group corresponding to the event detection camera. When an event detection camera is to also be classified as a pre-generated group, the surveillance display apparatus 10 may classify the event detection camera as the corresponding group without generating a new group.

In this manner, systems and methods employing the inventive concepts may implement event-by-event surveillance camera management by classifying and managing the event detection cameras detecting the same-type event as one group.

According to an exemplary embodiment of the invention, the surveillance display apparatus 10 may arrange and display one or more real-time images acquired by the one or more event detection cameras on the first screen 401 of the display 400 by the one or more groups (S53). Since this has been described above with reference to FIGS. 2 to 4, redundant descriptions thereof will be omitted for conciseness.

According to an exemplary embodiment of the invention, the surveillance display apparatus 10 may display one or more real-time images acquired by the one or more surveillance cameras on the second screen 402 of the display 400 (S54). Since this has been described above with reference to FIG. 5, redundant descriptions thereof will be omitted for conciseness.

The image displaying methods according to exemplary embodiments of the invention may also be embodied as computer-readable codes on a computer-readable recording medium. The computer-readable recording medium may include any data storage device that may store data which may be thereafter read by a computer system. Examples of the computer-readable recording medium may include read-only memories (ROMs), random-access memories (RAMs), compact disk read-only memories (CD-ROMs), magnetic tapes, floppy disks, and optical data storage devices. The computer-readable recording medium may also be distributed over network-coupled computer systems so that the computer-readable codes may be stored and executed in a distributed fashion. Functional programs, codes, and code segments for accomplishing the inventive concepts may be easily construed by programmers skilled in the art to which the inventive concepts pertain.

As described above, according to exemplary embodiments of the invention, the apparatuses and methods employing the inventive concepts may allow the manager to cope with an event more rapidly and efficiently by repeatedly displaying not only a real-time image about the event but also an event occurrence image, which may be the start of the event, on a separate screen distinguished from a screen on which images of all channels are displayed in fixed positions.

According to exemplary embodiments of the invention, the apparatuses and methods employing the inventive concepts may allow easy image identification by grouping the detected events and providing the group-by-group event images to the user.

According to exemplary embodiments of the invention, the apparatuses and methods employing the inventive concepts may provide the past images to the user more effectively.

Although the inventive concepts have been described with reference to the embodiments illustrated in the drawings, this is merely an example and those of ordinary skill in the art will understand that various modifications and other equivalent embodiments may be derived therefrom.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A method for dynamically obtaining and displaying surveillance images and dynamically tracking events, the method comprising:
receiving event occurrence information corresponding to one or more surveillance cameras;
classifying one or more surveillance cameras detecting an event occurrence into one or more groups of event detection cameras based on the event occurrence information;
dynamically arranging and displaying one or more real-time images acquired by the one or more event detection cameras on a first screen, the real-time images being dynamically arranged on the first screen according to the one or more groups, and the arrangement of the real-time images on the first screen being dynamically variable according to a number of the detected events; and
displaying an event image acquired within a preset time range before and after a first event detection time point by the event detection camera that first detects an event among the event detection cameras belonging to each group.

2. The method of claim 1, wherein the step of dynamically arranging and displaying comprises:
dividing the first screen into one or more first regions based on the number of groups; and
matching each of the one or more first regions to at least one group.

3. The method of claim 2, wherein:
the step of dynamically arranging and displaying further comprises:
dividing the first region into one or more second regions;
repeatedly displaying the event image of the group corresponding to the first region in any one of the one or more second regions; and
displaying the real-time image acquired by the event detection camera belonging to the group corresponding to the first region in the other second region among the one or more second regions except the second region in which the event image is displayed.

4. The method of claim 3, wherein:
the step of dividing the first screen into one or more first regions divides the first screen such that the one or more first regions are arranged in a first direction; and
the step of dividing the first region into one or more second regions divides the first region such that the one or more second regions are arranged in a second direction different from the first direction.

5. The method of claim 3, wherein to step of dynamically arranging and displaying further comprises, when an extra second region for arranging the real-time image acquired by the event detection camera is not present in the first region:
dynamically re-arranging and displaying the real-time image acquired by the event detection camera in the other second region except the second region displaying the event image; and
sequentially displaying the real-time image in an event occurrence detection order from a time point when the extra second region is not present.

6. The method of claim 3, wherein:
the step of dynamically arranging and displaying further comprises:
acquiring a user input to at least one of the one or more first regions; and
dividing the first screen into one or more third regions based on the user input;
repeatedly displaying the event image of the group corresponding to the user input in any one of the one or more third regions; and
displaying the real-time image acquired by the event detection camera belonging to the group corresponding to the user input in the other third region among the one or more third regions except the region in which the event image is displayed.

7. The method of claim 6, wherein the step of dynamically arranging and displaying further comprises displaying the image displayed in the third region, instead of the image displayed in the first region and the second region, on the first screen.

8. The method of claim 6, wherein the step of dynamically arranging and displaying further comprises, when an extra third region for arranging the real-time image acquired by the event detection camera is not present in the first screen:
dynamically re-arranging and displaying the real-time image acquired by the event detection camera in the other third region except the third region displaying the event image, sequentially in an event occurrence detection order from a time point when the extra third region is not present.

9. The method of claim 3, wherein the step of dynamically arranging and displaying further comprises displaying a favorite, pre-stored image in the other second region among the one or more second regions except the region in which the event image is displayed.

10. The method of claim 9, wherein the step of displaying the favorite image comprises:
identifying an event type of the group corresponding to the first region; and
displaying the favorite image corresponding to the event type among the pre-stored favorite images in the other second region among the second regions included in the first region, except the region in which the event image is displayed.

11. The method of claim 2, wherein the step of classifying classifies the one or more event detection cameras into one or more groups according to a type of the event.

12. The method of claim 11, wherein:
the step of classifying further comprise generating, when an event detection camera is not to be classified as a pre-generated group, a new group corresponding to the event detection camera; and
the step of dividing the first screen into one or more first regions further comprises dividing the first screen into one or more first regions based on the number obtained by adding the number of new groups to the number of groups.

13. The method of claim 1, further comprising displaying one or more real-time images acquired by the one or more surveillance cameras on a second screen distinguished from the first screen, along with an event identification mark.

14. An apparatus for dynamically obtaining and displaying surveillance images and dynamically tracking events, comprising:
an information receiver configured to receive event occurrence information corresponding to one or more surveillance cameras;
a group generator configured to classify one or more surveillance cameras detecting event occurrence into one or more groups of event detection cameras based on the event occurrence information; and
a display controller configured to dynamically arrange and display one or more real-time images acquired by the one or more event detection cameras on a first screen according to the one or more groups, the arrangement of the real-time images on the first screen being dynamically variable according to a number of the detected events,
wherein the display controller is configured to further display an event image acquired within a preset time range before and after a first event detection time point by the event detection camera first detecting an event among the event detection cameras belonging to each group.

15. The apparatus of claim 14, wherein the display controller is further configured to divide the first screen into one or more first regions based on the number of groups, and to match each of the one or more first regions to at least one group.

16. The apparatus of claim 15, wherein the display controller is further configured to:

divide the first region into one or more second regions;

repeatedly display the event image of the group corresponding to the first region in any one of the one or more second regions; and display the real-time image acquired by the event detection camera belonging to the group corresponding to the first region in the other second region among the one or more second regions except the second region in which the event image is displayed.

17. The apparatus of claim 16, wherein the display controller is further configured to display a favorite, pre-stored image in the other second region among the one or more second regions except the region in which the event image is displayed.

18. The apparatus of claim 17, wherein the display controller is further configured to identify an event type of the group corresponding to the first region and to display the favorite image corresponding to the event type among the pre-stored favorite images in the other second region among the second regions included in the first region except the region in which the event image is displayed.

19. The apparatus of claim 14, wherein the display controller is further configured to classify the one or more event detection cameras into one or more groups according to a type of the event.

20. The apparatus of claim 14, wherein the display controller is further configured to display one or more real-time images acquired by the one or more surveillance cameras on a second screen distinguished from the first screen; and to further display an event identification mark in the image.

* * * * *